June 22, 1965  N. O. ROSAEN  3,190,445
FLUID SYSTEM FITTINGS
Filed Sept. 10, 1962
FIG. 1.
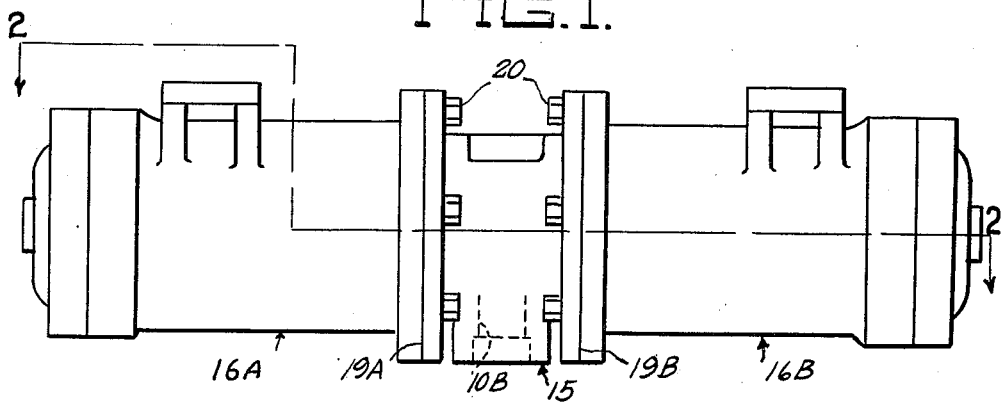
FIG. 2.
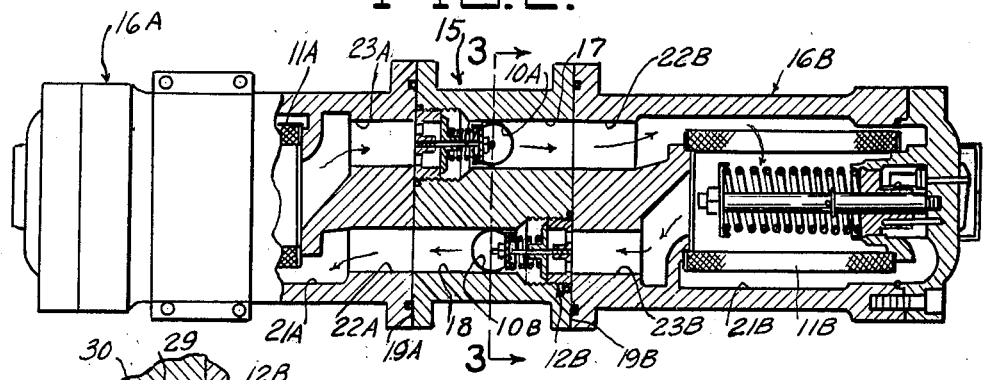
FIG. 5.
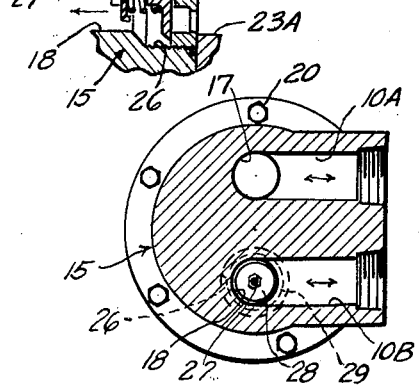
FIG. 4.
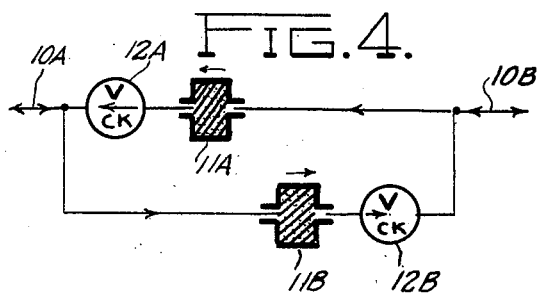
FIG. 3.
INVENTOR.
NILS O. ROSAEN
BY
Hanke + Hanke
ATTORNEYS 3,190,445
FLUID SYSTEM FITTINGS
Nils O. Rosaen, Bloomfield Hills, Mich., assignor to The Rosaen Filter Company, Hazel Park, Mich., a corporation of Michigan
Filed Sept. 10, 1962, Ser. No. 222,295
3 Claims. (Cl. 210—117)

My invention relates to fluid filtering and treating systems, and more particularly to a means for filtering or treating reverse flowing fluid systems.

With fluid filters and other fluid treating devices which are naturally uni-directional, their use in fluid systems having reverse flow characteristics, such as certain hydraulic control systems and the like, is often impractical or complicated.

An object of the present invention is to improve fluid flow systems by providing a simplified means for filtering or treating fluid regardless of flow direction.

Another object is to provide an improved means for treating fluid in a reverse flow fluid system.

A further object of the invention is to facilitate fluid treating in a reverse flow system by providing a simplified valve member to which uni-flow filters or other devices may be connected.

For a more complete understanding of the invention reference may be had to the accompanying drawing illustrating a preferred embodiment of the invention in which like reference characters refer to like parts throughout the several views and in which FIG. 1 is an elevational side view of the filter and valve housings as assembled.

FIG. 2 is a longitudinal cross-sectional view taken substantially on the line 2—2 of FIG. 1.

FIG. 3 is a lateral cross-sectional view taken on the line 3—3 of FIG. 2.

FIG. 4 is a diagrammatic view illustrating system operation, and

FIG. 5 is an enlarged view of the check valve.

The system as indicated in FIG. 4 is, in effect, disposed in series between portions of a fluid line adapted to be connected to fluid ports 10A–10B through which fluid may flow in either direction, and comprises a pair of unidirectional flow filters 11A and 11B disposed in parallel but in reverse to each other, and having associated therewith check valves 12A and 12B to insure proper flow. It will be noted that with flow in one direction in the entire system, one filter will be operative but the other will not be, its check valve being held closed by the pressure of the fluid entering the system which inherently is greater than the pressure of fluid leaving the system. In the disclosed filter system, the check valves 12A and 12B must be located on the outlet sides of the respective filters 11A and 11B so that fluid passing through the valves is already filtered, eliminating the possibility of valve failure due to foreign matter.

The fluid ports 10A, 10B, the filters 11A, 11B and the check valves 12A, 12B will all be seen in FIG. 2.

In FIGS. 1, 2 and 3, the assembly of a mounting block or valve housing 15 with two filter housings 16A and 16B is illustrated. The mounting block or valve housing 15 has a pair of parallel fluid passages 17 and 18 extending between a pair of opposite mounting faces 19A and 19B on which the respective filter housings 16A and 16B are secured by any means such as bolts 20. The reverse flow ports 10A and 10B are provided in the mounting block 15 and intersect the passages 17 and 18 as shown. The filter housings 16A and 16B have chambers 21A, 21B respectively in which are located the filters 11A, 11B. The housings 16A and 16B have inlet passages 22A, 22B leading to the outer peripheries of the chambers 21A, 21B, and outlet passages 23A, 23B leading to the centers of the chambers 21A, 21B, flow of fluid being from outside to inside the cylindrical filter cartridges 11A, 11B.

Inlet passage 22B and outlet passage 23A are aligned with the passage 17, while inlet passage 22A and outlet passage 23B are aligned with the passage 18, as shown. The check valve 12A is disposed between passages 23A and 17, and the check valve 12B is disposed between the passages 23B and 18.

Typical construction of the check valve 12B is illustrated in FIG. 5 as preferably comprising a ported plate 25 threaded into the enlarged end 26 of the bore 18. A rod 27 is carried by the plate 25 and supports a spring seat element 28. The check valve element 29 is resiliently urged by a spring 30 to seat on the inner side of the plate 25, and will open under pressure of fluid passing through the plate 25.

It will thus be seen that if fluid flow is into the port 10B, it will pass through passage 18 into the inlet passage 22A, through the filter 11A and out the passage 23A, opening the check valve 12A to pass through passage 17 out of the port 10A. On the other hand, if flow is into the port 10A, fluid will pass through the passage 17 into the inlet passage 22B, through the filter 11B and out the passage 23B, opening the check valve 12B to pass through the passage 18 and out the port 10B.

Recirculation of fluid cannot occur since the initial inlet pressure will hold the respective check valve closed, assisting the valve spring.

Fluid will thus be filtered in the system regardless of direction of flow. It will be noted that the same system will be equally applicable to uniflow fluid treating devices other than cartridge type filters.

Although I have described only one embodiment of the present invention, it will be apparent to one skilled in the art to which the invention pertains that various changes and modifications may be made therein without departing from the spirit of the invention as expressed by the scope of the appended claims.

I claim:
1. A filtering means for a reverse flow fluid system comprising
 (a) a central mounting block having a first and a second port therein each adapted for connection with a fluid system,
 (b) a first and a second enclosed filter device mounted on opposed faces of said mounting block, each filter device having a fluid inlet and a fluid outlet passage,
 (c) a first passage being provided in said mounting block connecting said fluid inlet passage of said first filter device and said fluid outlet passage of said second filter device with said first mounting block port, and a second passage being provided in said mounting block connecting said fluid inlet passage of said second filter device and said fluid outlet passage of said first outlet passage of said first filter device with said second mounting block port,
 (d) a first check valve means and a second check valve means each mounted in said mounting block,
 (e) said first check valve means being mounted in said first passage intermediate said fluid outlet passage of said second filter device and said first port and being operable to block fluid flow in a direction from said first port to said fluid inlet passage of said second filter device and to permit fluid flow from said fluid outlet passage of said second filter device to said first port,
 (f) said second check valve means being mounted in said second passage intermediate said fluid outlet passage of said first filter device and said second port and being operable to block fluid flow in a direction from said second port to said fluid outlet passage of said first filter device and to permit fluid flow from said fluid outlet passage of said first filter device to said second port.

2. A filtering means comprising
(a) a central mounting block having a first and a second port therein each adapted for connection with a fluid system,
(b) said mounting block having opposite mounting faces,
(c) a first and a second enclosed filter device respectively mounted on said opposite mounting faces, each of said filter devices having a fluid inlet passage and a fluid outlet passage,
(d) a first passage being provided in said mounting block extending from one of said mounting faces to the other and connecting said fluid inlet passage of said first filter device and said fluid outlet passage of said second filter device with said first mounting block port, and a second passage being provided in said mounting block extending from one of said mounting faces to the other and connecting said fluid inlet passages of said second filter device and said fluid outlet passage of said first filter device with said second mounting block port,
(e) a first check valve means and a second check valve means each mounted in said mounting block,
(f) said first check valve means being mounted in said first passage intermediate said fluid outlet passage of said second filter device and said first port and being operable to block fluid flow in a direction from said first port to said fluid outlet passage of said second filter device and to permit fluid flow from said fluid outlet passage of said second filter device to said first port,
(g) said second check valve means being mounted in said second passage intermediate said fluid outlet passage of said first filter device and said second port and being operable to block fluid flow in a direction from said second port to said fluid outlet passage of said first filter device and to permit fluid flow from said fluid outlet passage of said first filter device to said second port.

3. A filtering means comprising
(a) a central mounting block having opposite mounting faces,
(b) a first and a second enclosed filter device each respectively mounted on one of said mounting faces, each of said filter devices having a fluid inlet passage and a fluid outlet passage,
(c) said mounting block being provided with a first and a second passage extending through said mounting block from one of said mounting faces to the other, said mounting block passages being substantially parallel,
(d) said first mounting block passage connecting said fluid inlet passage of said first filter device with said fluid outlet passage of said second filter device and said second mounting block passage connecting said fluid inlet passage of said second filter device with said fluid outlet passage of said first filter device,
(e) said mounting block being provided with a first and a second port therein each adapted for connection with a fluid system and respectively registering with said first passage and said second passage,
(f) a first check valve means and a second check valve means each mounted in said mounting block,
(g) said first check valve means being mounted in said first passage intermediate said fluid outlet passage of said second filter device and said first port and being operable to block fluid flow in a direction from said first port to said fluid outlet passage of said second filter device and to permit fluid flow from said fluid outlet passage of said second filter device to said first port,
(h) said second check valve means being mounted in said second passage intermediate said fluid outlet passage of said first filter device and said second port and being operable to block fluid flow in a direction from said second port to said fluid outlet passage of said first filter device and to permit fluid flow from said fluid outlet passage of said first filter device to said second port.

References Cited by the Examiner

UNITED STATES PATENTS

| 1,780,663 | 11/30 | Winslow et al. | 210—136 |
| 2,134,413 | 10/38 | Munoz | 210—316 X |
| 2,280,930 | 4/42 | Reeves | 210—340 X |
| 2,679,320 | 5/54 | Walton | 210—340 X |
| 3,077,989 | 2/63 | Larkin | 210—340 X |
| 3,098,819 | 7/63 | Sager | 210—97 |

FOREIGN PATENTS

| 1,118,502 | 11/61 | Germany. |
| 822,322 | 10/59 | Great Britain. |

REUBEN FRIEDMAN, *Primary Examiner.*

HARRY B. THORNTON, HERBERT L. MARTIN,
*Examiners.*